United States Patent
Pariseau et al.

(10) Patent No.: US 8,659,261 B2
(45) Date of Patent: Feb. 25, 2014

(54) BATTERY PACK ENUMERATION METHOD

(75) Inventors: David Kevin Pariseau, Los Altos, CA (US); Michael Keith Collins, Cupertino, CA (US); Yang Wang, Palo Alto, CA (US); Peng Zhou, El Cerrito, CA (US)

(73) Assignee: Sinoelectric Powertrain Corporation, Sunnyvale, CA (US)

( * ) Notice: Subject to any disclaimer, the term of this patent is extended or adjusted under 35 U.S.C. 154(b) by 650 days.

(21) Appl. No.: 12/938,277

(22) Filed: Nov. 2, 2010

(65) Prior Publication Data

US 2012/0013290 A1 Jan. 19, 2012

Related U.S. Application Data

(60) Provisional application No. 61/364,313, filed on Jul. 14, 2010.

(51) Int. Cl.
*H02J 7/00* (2006.01)

(52) U.S. Cl.
USPC .................. 320/106; 320/104; 320/119

(58) Field of Classification Search
USPC ........................................................ 320/106
See application file for complete search history.

(56) References Cited

U.S. PATENT DOCUMENTS

| | | | |
|---|---|---|---|
| 2,258,221 A | 10/1941 | Rochow | |
| 4,135,593 A | 1/1979 | Fowkes | |
| 4,652,964 A | 3/1987 | Zigenbein | |
| 4,862,243 A | 8/1989 | Welch et al. | |
| 5,059,895 A | 10/1991 | Cataldi et al. | |
| 5,158,841 A | 10/1992 | Mennicke et al. | |
| 5,207,276 A | 5/1993 | Scofield | |
| 5,227,259 A | 7/1993 | Weaver et al. | |
| 5,534,759 A | 7/1996 | Evans et al. | |
| 5,542,488 A | 8/1996 | Nixon | |
| 5,608,304 A | 3/1997 | Okumura | |
| 5,624,003 A | 4/1997 | Matsuki et al. | |

(Continued)

FOREIGN PATENT DOCUMENTS

| | | |
|---|---|---|
| CN | 101141012 A | 3/2008 |
| CN | 101141012 A1 | 3/2008 |

(Continued)

OTHER PUBLICATIONS

Article from Tyco Electronics that was published Apr. 14, 2008, entitled "Polymeric Positive Temperature Coefficient". Retrieved form the Internet<http://tycoelectronics.custhelp.com/. 1 page.

(Continued)

*Primary Examiner* — Edward Tso
*Assistant Examiner* — Johali Torres Ruiz

(57) ABSTRACT

A method of registering a plurality of Battery-Monitoring-Units (BMUs) in a battery pack with a Battery-Management-System (BMS), the method comprising: providing an indication to a user, wherein the indication prompts the user to register one of the BMUs with the BMS; the user performing an action on a communication-initiating mechanism on one of the BMUs, wherein the communication-initiating mechanism is configured to initiate the sending of a communication by the BMU to the BMS in response to the user performing the action; the BMU sending a communication to the BMS in response to the user performing the action on the communication-initiating mechanism; the BMS receiving the communication from the BMU; and the BMS registering the BMU in response to receiving the communication from the BMU.

30 Claims, 3 Drawing Sheets

(56) References Cited

U.S. PATENT DOCUMENTS

| | | |
|---|---|---|
| 5,670,861 A | 9/1997 | Nor |
| 5,767,659 A | 6/1998 | Farley |
| 5,806,618 A | 9/1998 | Luode |
| 5,815,824 A | 9/1998 | Saga et al. |
| 5,834,132 A | 11/1998 | Hasegawa et al. |
| 5,861,610 A | 1/1999 | Weiss |
| 5,903,154 A | 5/1999 | Zhang et al. |
| 5,929,741 A | 7/1999 | Nishimura et al. |
| 5,948,298 A | 9/1999 | Ijaz |
| 6,132,896 A | 10/2000 | Sunderland et al. |
| 6,337,559 B1 | 1/2002 | Sato |
| 6,444,350 B1 | 9/2002 | Toya et al. |
| 6,531,846 B1 | 3/2003 | Smith |
| 6,631,775 B1 | 10/2003 | Chaney |
| 6,747,437 B2 | 6/2004 | Chiu |
| 7,262,605 B2 | 8/2007 | Seo et al. |
| 7,270,910 B2 | 9/2007 | Yahnker et al. |
| 7,507,500 B2 | 3/2009 | Donnelly et al. |
| 7,508,171 B2 | 3/2009 | Carrier et al. |
| 7,520,355 B2 | 4/2009 | Chaney |
| 7,667,432 B2 | 2/2010 | West et al. |
| 7,675,263 B2 | 3/2010 | Kawasumi et al. |
| 7,923,967 B2 | 4/2011 | Hamaguchi et al. |
| 7,952,330 B2 | 5/2011 | Mori |
| 8,004,244 B2 | 8/2011 | Cromer et al. |
| 8,058,846 B2 | 11/2011 | Kim |
| 8,198,975 B2 | 6/2012 | Sha et al. |
| 8,203,312 B2 | 6/2012 | Yoshikawa |
| 2002/0188387 A1 | 12/2002 | Woestman et al. |
| 2003/0090855 A1 | 5/2003 | Chu et al. |
| 2003/0205421 A1 | 11/2003 | Allen et al. |
| 2004/0018417 A1 | 1/2004 | Stack |
| 2005/0069773 A1 | 3/2005 | Nakai |
| 2005/0089750 A1 | 4/2005 | Ng et al. |
| 2007/0054178 A1 | 3/2007 | Moon et al. |
| 2007/0089442 A1 | 4/2007 | Tsuchiya |
| 2007/0188147 A1 | 8/2007 | Straubel et al. |
| 2008/0053716 A1 | 3/2008 | Scheucher |
| 2008/0096072 A1 | 4/2008 | Fukasako et al. |
| 2008/0230288 A1 | 9/2008 | Shiomi et al. |
| 2008/0275600 A1 | 11/2008 | Rask et al. |
| 2008/0290080 A1 | 11/2008 | Weiss |
| 2009/0041992 A1 | 2/2009 | Umeda et al. |
| 2009/0123814 A1 | 5/2009 | Cabot et al. |
| 2010/0021802 A1 | 1/2010 | Yang et al. |
| 2010/0114512 A1* | 5/2010 | Cotton et al. ............. 702/63 |
| 2010/0136392 A1 | 6/2010 | Pulliam et al. |
| 2010/0194348 A1* | 8/2010 | Wang et al. ............. 320/136 |
| 2010/0275810 A1* | 11/2010 | Barbee et al. ............. 105/50 |
| 2010/0291418 A1 | 11/2010 | Zhou et al. |
| 2010/0291419 A1 | 11/2010 | Zhou |
| 2010/0291426 A1 | 11/2010 | Zhou |
| 2010/0291427 A1 | 11/2010 | Zhou |
| 2010/0295382 A1* | 11/2010 | Tae et al. ............. 307/150 |
| 2011/0050175 A1 | 3/2011 | Odaohhara et al. |
| 2011/0248684 A1 | 10/2011 | Zhou |
| 2012/0181988 A1 | 7/2012 | Uchibori |

FOREIGN PATENT DOCUMENTS

| | | |
|---|---|---|
| CN | 201117742 Y | 9/2008 |
| JP | 2008288046 A | 11/2008 |
| JP | 2008288046 A | 11/2008 |
| JP | 2008288046 A1 | 11/2008 |
| JP | 2011171255 A | 1/2011 |
| WO | 2005086196 A1 | 9/2005 |

OTHER PUBLICATIONS

International Search report dated Jun. 30, 2011, International Application No. PCT/US2011/031634, 6 pages.
SIPO Office action dated May 6, 2013 for application 201110208048.8.

* cited by examiner

BATTERY PACK ENUMERATION METHOD

CROSS-REFERENCE TO RELATED APPLICATIONS

This application claims priority to U.S. Provisional Patent Application Ser. No. 61/364,313, filed Jul. 14, 2010 and entitled "BATTERY MONITOR SYSTEM FOR AN ELECTRIC VEHICLE," which is hereby incorporated by reference in its entirety as if set forth herein.

FIELD OF THE INVENTION

The present invention relates to managing batteries for electric vehicles. More specifically, the present invention relates to registering battery pack components in a battery pack using an enumeration method.

BACKGROUND OF THE INVENTION

For a multitude of reasons, it is advantageous to use electric vehicles having rechargeable batteries rather than vehicles using internal combustion engines. Electric vehicles are inherently more efficient, meaning more energy is used in locomotion than lost to heat than in conventional internal combustion engines. Also, electric vehicles do not exhaust any byproducts. However, the use of electric vehicles presents technical challenges. For example, the batteries in an electric vehicle must be monitored and managed. Electric vehicles having modular batteries can be particularly challenging, as they have multiple batteries or battery packs that must be monitored and managed.

SUMMARY OF THE INVENTION

The present invention introduces a method and system of registering battery pack components, such as Battery-Monitoring-Units (BMUs) that are configured to sense various battery module conditions. The present invention allows a user to register these battery pack components with a Battery-Management-System (BMS) using an enumeration method. As a result, a configuration table can easily be established, providing a linkage between the virtual address of the battery pack components and their physical setup.

In one aspect of the present invention, a method of registering a plurality of BMUs in a battery pack with a BMS is provided. The method comprises providing an indication to a user, wherein the indication prompts the user to register one of the BMUs with the BMS. The user then performs an action on a communication-initiating mechanism on one of the BMUs, wherein the communication-initiating mechanism is configured to initiate the sending of a communication by the BMU to the BMS in response to the user performing the action. The BMU sends a communication to the BMS in response to the user performing the action on the communication-initiating mechanism. The BMS receives the communication from the BMU, and the BMS registers the BMU in response to receiving the communication from the BMU.

In some embodiments, the steps of providing an indication, the user performing an action, the BMU sending a communication, the BMS receiving the communication, and the BMS registering the BMU are repeated for each BMU in the plurality of BMUs.

In some embodiments, the battery pack comprises a plurality of battery stacks, with each battery stack comprising a plurality of batteries. In some embodiments, each BMU corresponds to and is coupled to a distinct battery stack in the plurality of battery stacks, with each BMU being configured to monitor data about the plurality of batteries in the corresponding battery stack. In some embodiments, the BMS is coupled to the plurality of BMUs via a communication bus, wherein the BMS is configured to receive battery data from the BMUs and to send one or more commands to the BMUs via the communication bus. In some embodiments, the communication bus is a Controller-Area-Network (CAN) bus.

In some embodiments, the step of the BMS registering the BMU comprises the BMS storing a linkage between a virtual ID of the BMU and the physical configuration of the BMU. In some embodiments, the physical configuration of the BMU comprises identification of the batteries to which the BMU corresponds. In some embodiments, the linkage is stored in a lookup table. In some embodiments, the virtual ID is a CAN ID.

In some embodiments, the communication sent from the BMU to the BMS comprises a serial number that is unique to the BMU, and the step of the BMS registering the BMU comprises the BMS storing the serial number for the BMU.

In some embodiments, the communication-initiating mechanism is a push-button. In some embodiments, the step of providing an indication to a user comprises displaying an instruction on a screen.

In another aspect of the present invention, a registration system is provided. The registration system comprises: a plurality of battery stacks, each battery stack comprising a plurality of batteries; a plurality of BMUs, each BMU corresponding to and being coupled to a distinct battery stack in the plurality of battery stacks, wherein each BMU comprises a communication-initiating mechanism configured to initiate the sending of a communication in response to a user performing an action on the communication-initiating mechanism; and a BMS coupled to the plurality of BMUs, wherein the BMS is configured to receive the communication and to register the BMU from which it received the communication in response to receiving the communication.

In some embodiments, each BMU is configured to monitor data about the plurality of batteries in the corresponding battery stack, and the BMS is coupled to the plurality of BMUs via a communication bus, wherein the BMS is configured to receive battery data from the BMUs and to send one or more commands to the BMUs via the communication bus. In some embodiments, the communication bus is a CAN bus.

In some embodiments, the BMS is configured to register the BMU by storing a linkage between a virtual ID of the BMU and the physical configuration of the BMU. In some embodiments, the physical configuration of the BMU comprises identification of the batteries to which the BMU corresponds. In some embodiments, the linkage is stored in a lookup table. In some embodiments, the virtual ID is a CAN ID.

In some embodiments, the communication sent from the BMU to the BMS comprises a serial number that is unique to the BMU, and the BMS is configured to register the BMU by storing the serial number for the BMU.

In some embodiments, the communication-initiating mechanism is a push-button. In some embodiments, the system further comprises means for providing an indication to a user, wherein the indication prompts the user to register one of the BMUs with the BMS. In some embodiments, the means for providing an indication comprises a screen.

In yet another aspect of the present invention, a program storage device readable by a machine, tangibly embodying a program of instructions executable by the machine to register a plurality of BMUs in a battery pack with a BMS is provided. The method comprising the steps of: providing an indication to a user, wherein the indication prompts the user to register one of the BMUs with the BMS; and registering the BMU with the BMS in response to the BMS receiving a communication from the BMU.

In some embodiments, the steps of providing an indication and registering the BMU are repeated for each BMU in the plurality of BMUs.

In some embodiments, the step of registering the BMU with the BMS comprises the storing a linkage between a virtual ID of the BMU and the physical configuration of the BMU. In some embodiments, the physical configuration of the BMU comprises identification of the batteries to which the BMU corresponds. In some embodiments, the linkage is stored in a lookup table. In some embodiments, the virtual ID is a CAN ID.

In some embodiments, the step of registering the BMU with the BMS comprises storing a serial number for the BMU.

In some embodiments, the step of providing an indication to a user comprises displaying an instruction on a screen.

DETAILED DESCRIPTION OF THE INVENTION

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Additionally, it is contemplated that certain method steps of the invention can be performed in alternative sequences to those disclosed in the flowcharts. Accordingly, the scope of the claims should not be limited to any specific order of method steps unless the order is required by the language of the claims.

In some embodiments, the present invention may be provided as a computer program product that may include a machine-readable medium having stored thereon instructions that may be used to program a computer (or other electronic devices) to perform a process according to the present invention. The machine-readable medium may include, but is not limited to, floppy diskettes, optical disks, CD-ROMs, ROMs, RAMs, magnet or optical cards, or other type of media/machine-readable medium suitable for storing electronic instructions.

Figure 1:
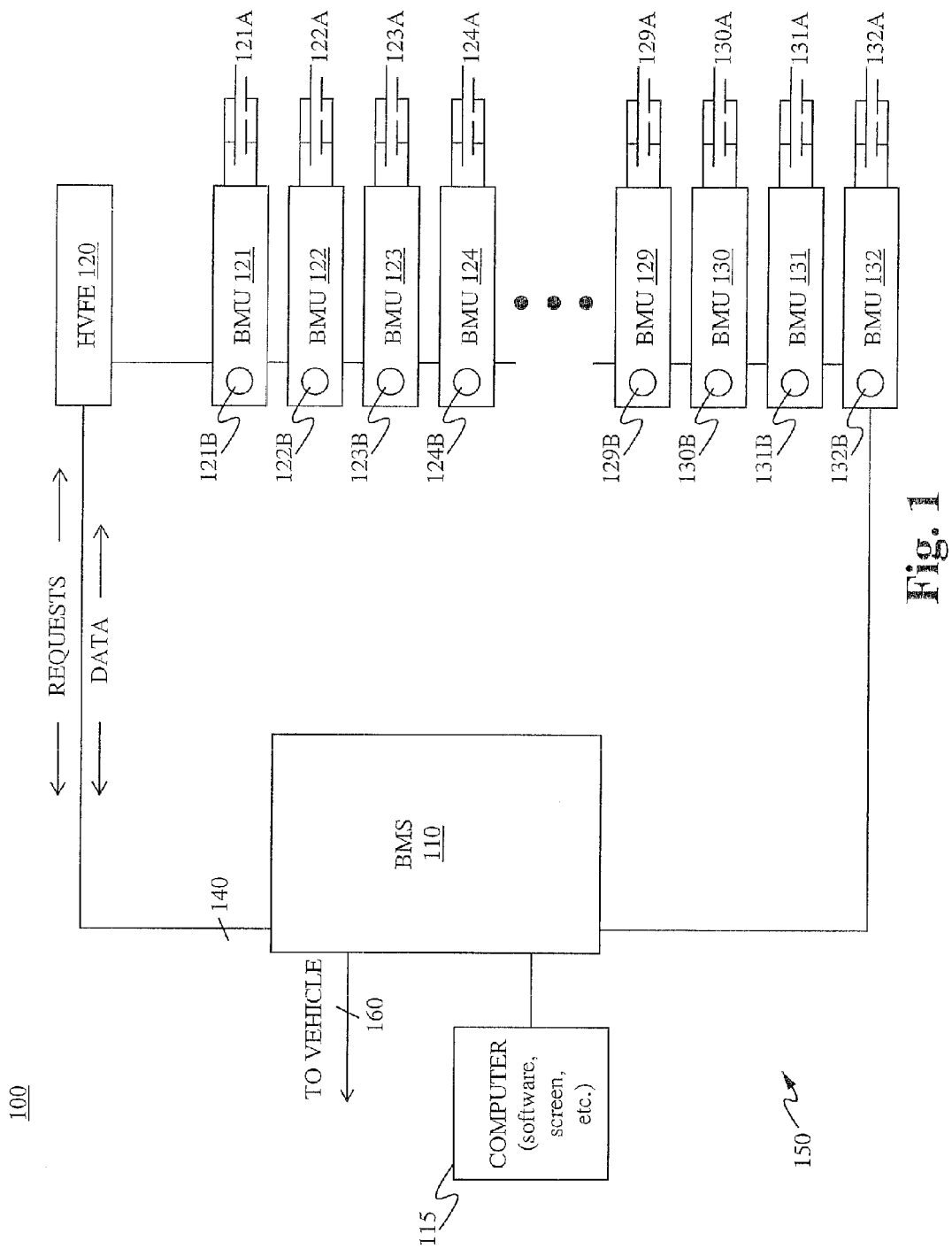
FIG. 1 illustrates one embodiment of a battery component registration system in accordance with the principles of the present invention.

FIG. 1 illustrates one embodiment of a battery component registration system 100 in accordance with the principles of the present invention. The system 100 comprises a Battery-Management-System (BMS) 110 in communication with a battery module. The battery module is configured to supply a voltage to a high-voltage circuit. In some embodiments, the battery module includes a High-Voltage-Front-End (HVFE) unit 120, Battery-Monitoring-Units (BMUs) 121-132, and battery stacks 121A-132A.

BMS 110 is configured to communicate with several external modules. Each module is in communication with at least some of the full complement of battery packs available on the electric vehicle. The communication with the modules is enabled by communication bus 140, preferably as part of a Controller-Area-Network (CAN) 150. A CAN is a bus standard designed to allow microcontrollers and devices to communicate with each other within a vehicle without a host computer. CAN is a message based protocol, designed for automotive applications, as well as industrial automation and medical equipment. Advantageously, the CAN 150 enables the system 100 as a hardware-oriented system and provides a quasi-real-time link between controllers to allow for a distributed control system.

The first of the external modules communicating with the BMS 110 is HVFE 120. In series with the HVFE 120 are a plurality of BMUs 121-132. Each BMU 121-132 is electrically coupled to a battery stack 121A-132A. For example, the first BMU 121 is electrically coupled to a stack of batteries 121A. In the exemplary embodiment shown, the each stack of batteries 121A-132A has four batteries. In other embodiments, the BMU 121 has ports to electrically couple to 12 batteries. In some embodiments, each battery stack has one dedicated BMU and comprises several battery cells that are arranged in both parallel and series. In some embodiments, some of the battery stacks have two corresponding BMUs. It is contemplated that other battery cell numbers and configurations are within the scope of the present invention.

The BMUs 121-132 each monitor their respective battery stack 121A-132A and are configured to sense various battery module conditions, such as cell-group voltage, temperature, current, and other useful data of each stack and to report the data to the BMS 110. The HVFE 120 is electrically coupled to all battery stacks 121A-132A and is able to measure parameters like the total current, voltage, and power either produced or received by the battery stacks 121A-132A. For example, in some embodiments, the BMUs 121-132 are each configured to measure the voltage of the stack of batteries that the BMU is electrically coupled to, on the order of 1-10V per cell-group in some embodiments, and the HVFE 120 is configured to measure the entire voltage of all battery stacks 121A-132A, on the order of 320V in some embodiments. The HVFE 120 is then able to perform a current integration to calculate the total discharge from the battery modules 121A-132A in coulombs to determine the remaining charge relative to the total output voltage that the HVFE 120 is measuring.

In some embodiments, the BMS 110 sends commands to and requests information from the battery module components, such as the HVFE unit 120 or the BMUs 121-132, via the communication bus 140. Furthermore, in some embodiments, the communication bus 140 is used to send battery data from the battery module components to the BMS 110. Additionally, in some embodiments, commands and requests are also sent from one or more of the battery module components to the BMS 110, while data is sent from the BMS 110 to one or more of the battery module components. For example, a BMU or HVFE unit can request a new program image. In this case, the request would be issued from the BMU/HVFE unit and the data (i.e., program image) would be sent from the BMS 110. Other examples include the transmission of configuration tables or other data from the BMS 110 to a BMU/HVFE unit and requests for assignment of dynamic bus identifications from a BMU/HVFE unit to the BMS 110.

In some embodiments, the HVFE 120 comprises intelligence, such as a microprocessor and memory that holds a look up table for relation of remaining coulombs of charge in the batteries and the output voltage, and can therefore output a total remaining distance or time that the electric vehicle. Alternatively, the intelligence is on board the BMS 110 or elsewhere in the electric vehicle. The CAN 150 comprises a second bus line 160 that electrically couples the BMS 110 with the electric vehicle (not shown). The BMS 110 can send battery data to a vehicle display (not shown), and instructions and data can be sent to the BMUs 121-132 from the electric vehicle. For example, the electric vehicle may ping the BMS 110 to retrieve battery data from the BMUs 121-132. Alternatively, an instruction can require the BMUs 121-132 to continually broadcast their status.

The present invention provides a system and method of registering the battery module components, such as the BMUs and the battery cells, with the BMS using an enumeration method. As a result, a configuration table, such as a look-up table, can easily be established linking the virtual address of the battery module components with their physical setup. The configuration table can store a variety of information about the battery pack's configuration, such as how many module boards are in the battery pack (e.g., 8 module boards), how many BMUs are on each module board (e.g., 1 BMU on each of the first 4 module boards and 2 BMUs on each of the last 4 module boards), how many battery cells in series the battery pack has (e.g., 100 battery cells in series), how many battery cells in parallel the battery pack has (e.g., 32 battery cells in parallel), and which particular BMU corresponds to which particular module board and to which particular battery cells in the battery pack (e.g., BMU number 5 corresponds to: module board number 5, in-series battery cells 37-44, and in-parallel battery cells 1-8).

The present invention enables the establishment of the configuration table without the burden of creating custom BMUs. Instead of custom BMUs, the present invention allows for the BMUs to be manufactured identically, both in terms of their hardware and firmware. An enumeration method is used to register the battery module components with the BMS. Each BMU comprises a communication-initiating mechanism that is configured to initiate the sending of a communication in response to a user performing an action on the communication-initiating mechanism. For example, in FIG. 1, BMUs 121-132 each have a corresponding communication-initiating mechanism 121B-132B. In some embodiments, the communication-initiating mechanism is a push-button or switch mechanism. However, it is contemplated that the communication-initiating mechanism can be provided in other forms as well.

Before the configuration table is built, the BMS does not know where each BMU is physically located and to which battery cells each BMU corresponds. However, the human user or operator does know these details. The user is prompted to register a particular BMU with the BMS. The user then performs an action on the communication-initiating mechanism of that particular BMU, such as by pushing the push-button. In response to its communication-initiating mechanism being acted upon, the BMU sends a communication to the BMS, registering the BMU information with the BMS. In this fashion, the BMS can receive BMU information for each BMU in the battery pack. In some embodiments, each BMUs CAN ID is used to build the configuration table. In some embodiments, this communication includes the details of the battery cells to which the BMU corresponds (e.g., how many in-series battery cells, how many in-parallel battery cells, etc.). In some embodiments, each BMU has its own unique serial number that is sent to the BMS when the communication-initiating mechanism is activated, and the serial number is used to build the configuration table.

The present invention uses this enumeration method of prompting the user to initiate a communication from each BMU to the BMS, one by one, in order to build a configuration table in the BMS without the need for excessive setup and maintenance. As a result of this enumerative registration, it is not necessary to pre-code the BMS with a configuration table, which would then require a recoding of the BMS when the battery pack is changed. Therefore, the present invention simplifies the setup and maintenance of the BMS.

It is contemplated that the prompting of the user can be achieved in a variety of ways. In some embodiments, a computer 115 is connected to the BMS 110. This computer 115 can be a laptop, a dedicated system, or a variety of other suitable computing means. Software on the computer 115 is used to prompt the user to initiate a communication from each BMU to the BMS. For example, the software can instruct the user to press the button on the first BMU of the first module. Once the user presses the button (or otherwise activates the communication-initiating mechanism) on the appropriate BMU, the software then instructs the user to press the button on the second BMU, and so on and so forth until each one of the BMUs has had its button pressed. In some embodiments, each BMU has a light (not shown) that blinks until the user presses the button on the BMU, at which point, the blinking light goes away, thus making it easy for the user to see which BMUs have not yet been registered.

In some embodiments, the prompting is displayed on the screen of the computer 115. In some embodiments, the software is loaded onto the BMS and the prompting is displayed on a screen on the BMS. In some embodiments, the registration communications sent by the BMUs upon the actuation of the communication-initiating mechanisms are sent to the computer 115 prior to the BMS. The computer 115 then builds the configuration table using the registration communications, and loads the configuration table onto the BMS. In other embodiments, the registration communications are sent to the BMS where they are used to build the configuration table without the assistance of a computer that is external to the BMS.

Figure 2:
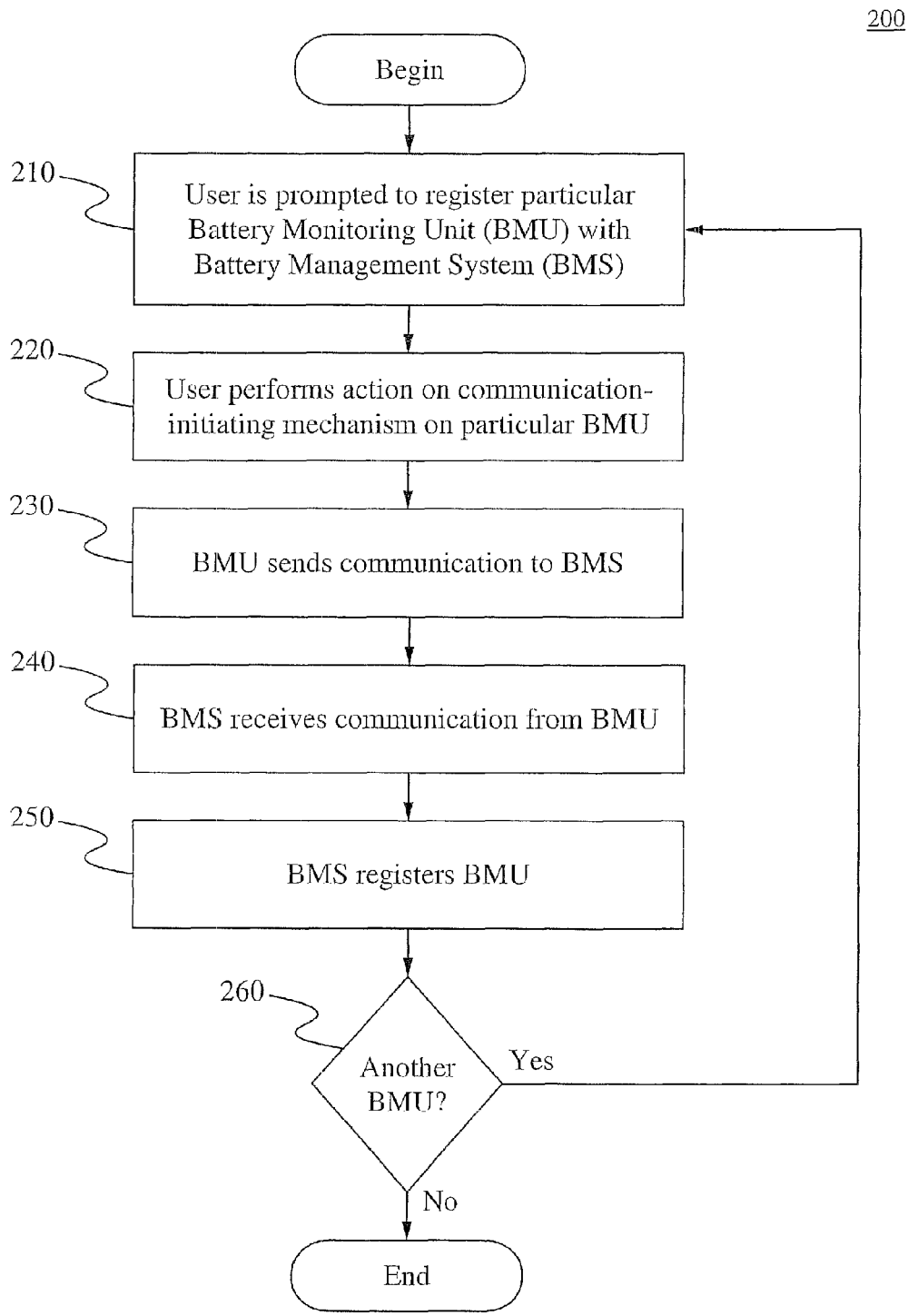
FIG. 2 illustrates one embodiment of a method of registering a plurality of BMUs in a battery pack with a BMS in accordance with the principles of the present invention.

FIG. 2 illustrates one embodiment of a method 200 of registering a plurality of BMUs in a battery pack with a BMS in accordance with the principles of the present invention.

At step 210, the battery component registration system, such as battery component registration system 100 discussed above, is provided having a BMS and a plurality of battery module components, such as a plurality of BMUs and corresponding battery stacks. In some embodiments, the system 100 may be coupled to a vehicle at this stage. In other embodiments, the system 100 may not yet be coupled to a vehicle at this stage. A user is prompted to register a particular BMU with the BMS. As discussed above, such prompting may be provided in the form of an instruction displayed on a screen on the BMS or on a computer external to the BMS.

At step 220, the user performs an action on a communication-initiating mechanism that is connected to the particular BMU. As discussed above, the communication-initiating mechanism can be provided in a variety of different forms, including, but not limited to, a push-button or switch mechanism. The action performed on the communication-initiating mechanism by the user can be the pressing of a button or any other form of actuating or activating a mechanism.

At step 230, the BMU sends a communication to the BMS. As discussed above, this communication includes information related to the BMU for use in building the configuration table. In some embodiments, this information is configured to be used in providing a linkage between a virtual ID of the BMU and the physical configuration of the BMU. In some embodiments, this information includes the BMU's CAN ID. In some embodiments, this information includes the BMU's unique serial number. In some embodiments, this information includes the details of the battery cells to which the BMU corresponds (e.g., how many in-series battery cells, how many in-parallel battery cells, etc.).

At step 240, the BMS receives the communication from the BMU. As discussed above, in some embodiments, the communication is sent to an external computer, for the establishment of the configuration table, prior to the BMS. However, the communication is preferably sent to the BMS without going through a computer external to the BMS.

At step 250, the BMS registers the BMU. As previously mentioned, a configuration table, such as a look-up table, is created in or loaded onto the BMS. The BMS registers the linkage between the virtual address of the BMUs and their physical setup. In some embodiments, the BMS registers each BMU's unique serial number. In some embodiments, the BMS registers each BMU's CAN ID. In some embodiments, the BMS registers the details of the battery cells to which each BMU corresponds (e.g., how many in-series battery cells, how many in-parallel battery cells, etc.). In some embodiments, the BMS registers each BMU one by one after each registration communication is sent by a BMU. In some embodiments, the BMS registers all of the BMUs together after all of the BMUs have sent the registration communications to a computer external to the BMS.

At step 260, it is determined whether or not there is another BMU that needs to be registered with the BMS. If it is determined that another BMU that needs to be registered with the BMS, then the method repeats at step 210, where the user is prompted to register the next BMU. If it is determined that there is not another BMU that needs to be registered with the BMS, then the method ends.

Figure 3:
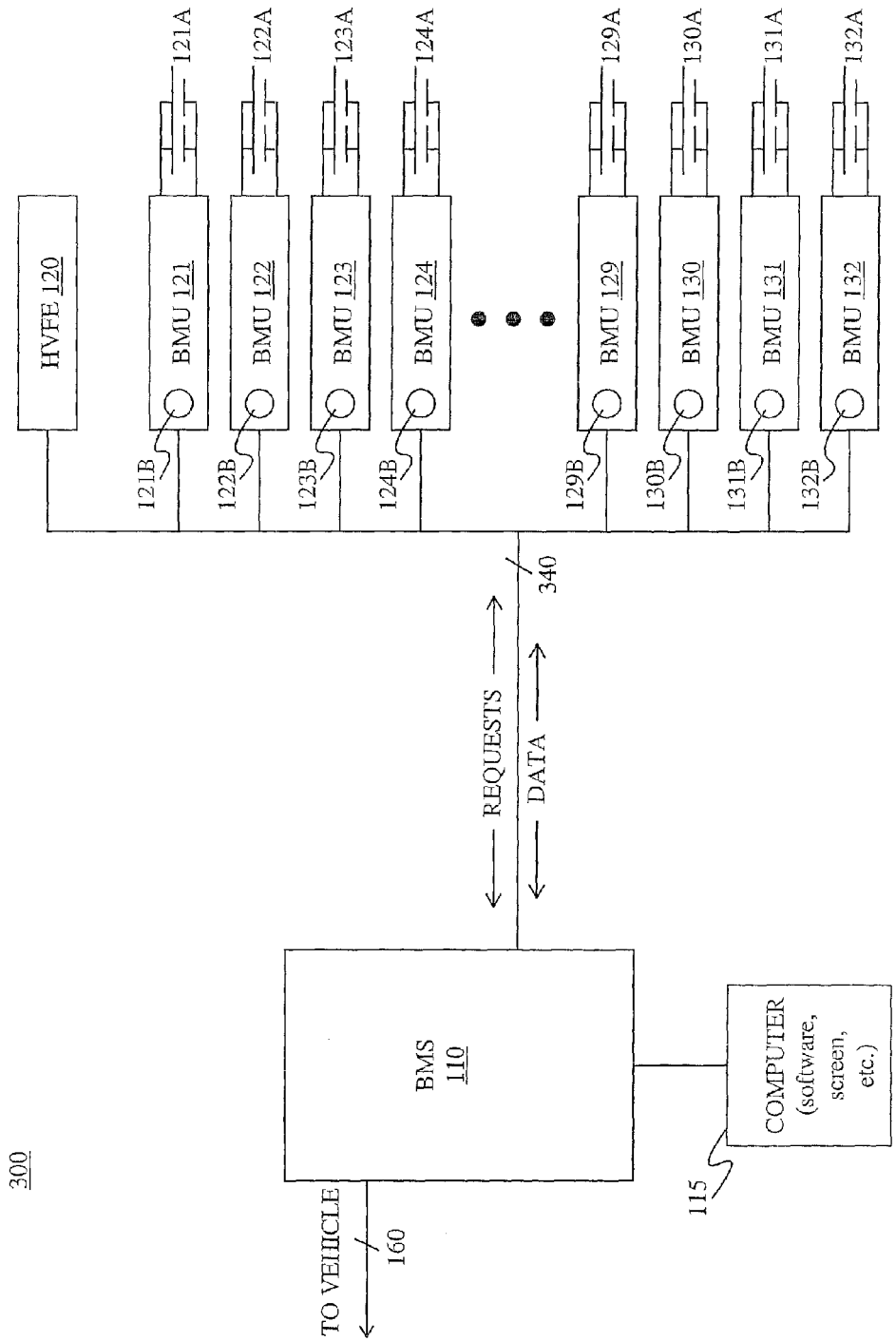
FIG. 3 illustrates an alternative embodiment of a battery component registration system in accordance with the principles of the present invention.

FIG. 3 illustrates an alternative embodiment of a battery component registration system 300 in accordance with the principles of the present invention. System 300 is similar to system 100, except that instead of the HVFE 120 and the BMUs 121-132 being connected to the BMS 110 in a serial loop via communication bus 140, the HVFE 120 and the BMUs 121-132 in system 300 are connected in parallel to the BMS 110 via communication bus 340, which is preferably a CAN bus.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of registering a plurality of Battery-Monitoring-Units (BMUs) in a battery pack within a vehicle with a Battery-Management-System (BMS), the method comprising:

providing an indication to a user, wherein the indication prompts the user to register one of the BMUs with the BMS;

the BMU sending a communication to the BMS in response to a user performing the action on a communication-initiating mechanism on one of the BMUs, wherein:

the communication-initiating mechanism is configured to initiate the sending of a communication by the BMU to the BMS via a communication bus in response to the user performing the action; and the communication bus is configured to allow microcontrollers within the vehicle to communicate with each other;

the BMS receiving the communication from the BMU; and the BMS registering the BMU in response to receiving the communication from the BMU.

2. The method of claim 1, wherein the steps of providing the indication, the BMU sending the communication, the BMS receiving the communication, and the BMS registering the BMU are repeated for each BMU in the plurality of BMUs.

3. The method of claim 1, wherein:

the battery pack comprises a plurality of battery stacks, each battery stack comprising a plurality of batteries;

each BMU corresponds to and is coupled to a distinct battery stack in the plurality of battery stacks, wherein each BMU is configured to monitor data about the plurality of batteries in the corresponding battery stack; and the BMS is coupled to the plurality of BMUs via the communication bus, wherein the BMS is configured to receive battery data from the BMUs and to send one or more commands to the BMUs via the communication bus.

4. The method of claim 3, wherein the communication bus is a Controller-Area-Network (CAN) bus.

5. The method of claim 3, wherein the step of the BMS registering the BMU comprises the BMS storing a linkage between a virtual ID of the BMU and the physical configuration of the BMU.

6. The method of claim 5, wherein the physical configuration of the BMU comprises identification of the batteries to which the BMU corresponds.

7. The method of claim 5, wherein the linkage is stored in a lookup table.

8. The method of claim 5, wherein the virtual ID is a CAN ID.

9. The method of claim 3, wherein:

the communication sent from the BMU to the BMS comprises a serial number that is unique to the BMU; and the step of the BMS registering the BMU comprises the BMS storing the serial number for the BMU.

10. The method of claim 1, wherein the communication-initiating mechanism is a push-button.

11. The method of claim 1, wherein the step of providing the indication to a user comprises displaying an instruction on a screen.

12. The device of claim 1, wherein the communication bus is further configured to allow the microcontrollers to communicate with each other without a host computer.

13. A registration system for Battery-Monitoring-Units (BMUs) of a vehicle, the registration system comprising:

a plurality of battery stacks, each battery stack comprising a plurality of batteries;

a plurality of Battery-Monitoring-Units (BMUs), each BMU corresponding to and being coupled to a distinct battery stack in the plurality of battery stacks, wherein:

each BMU comprises a communication-initiating mechanism configured to initiate the sending of a communication, via a communication bus, in response to a user performing an action on the communication-initiating mechanism; and the communication bus is configured to allow microcontrollers within the vehicle to communicate with each other; and a Battery-Management-System (BMS) coupled to the plurality of BMUs, wherein the BMS is configured to receive the communication and to register the BMU from which it received the communication in response to receiving the communication.

14. The system of claim 13, wherein:

each BMU is configured to monitor data about the plurality of batteries in the corresponding battery stack; and wherein the BMS is configured to receive battery data from the BMUs and to send one or more commands to the BMUs via the communication bus.

15. The system of claim 14, wherein the communication bus is a Controller-Area-Network (CAN) bus.

16. The system of claim 13, wherein the BMS is configured to register the BMU by storing a linkage between a virtual ID of the BMU and the physical configuration of the BMU.

17. The system of claim 16, wherein the physical configuration of the BMU comprises identification of the batteries to which the BMU corresponds.

18. The system of claim 16, wherein the linkage is stored in a lookup table.

19. The system of claim 16, wherein the virtual ID is a CAN ID.

20. The system of claim 13, wherein:

the communication sent from the BMU to the BMS comprises a serial number that is unique to the BMU; and the BMS is configured to register the BMU by storing the serial number for the BMU.

21. The system of claim 13, further comprising means for providing the indication to a user, wherein the indication prompts the user to register one of the BMUs with the BMS.

22. The system of claim 21, wherein the means for providing an indication comprises a screen.

23. A program storage device readable by a machine, tangibly embodying a program of instructions executable by the machine to register a plurality of Battery-Monitoring-Units (BMUs) of a vehicle in a battery pack with a Battery-Management-System (BMS), the instructions comprising a series of computer readable steps to effect:

providing an indication to a user, wherein the indication prompts the user to register one of the BMUs with the BMS via a communication bus; and registering the BMU with the BMS in response to the BMS receiving a communication from the BMU, wherein the communication bus is configured to allow microcontrollers within the vehicle to communicate with each other.

24. The device of claim 23, wherein the steps of providing an indication and registering the BMU are repeated for each BMU in the plurality of BMUs.

25. The device of claim 23, wherein the step of registering the BMU with the BMS comprises the storing a linkage between a virtual ID of the BMU and the physical configuration of the BMU.

26. The device of claim 25, wherein the physical configuration of the BMU comprises identification of the batteries to which the BMU corresponds.

27. The device of claim 25, wherein the linkage is stored in a lookup table.

28. The device of claim 25, wherein the virtual ID is a CAN ID.

29. The device of claim 23, wherein the step of registering the BMU with the BMS comprises storing a serial number for the BMU.

30. The device of claim 23, wherein the step of providing an indication to the user comprises displaying an instruction on a screen.

* * * * *